Dec. 4, 1962 R. L. PETRITZ ETAL 3,067,283

INFRARED IMAGE SYSTEM

Filed Dec. 10, 1959 4 Sheets-Sheet 1

INVENTORS.
R.L. PETRITZ
O.P. MANLEY
J.O. VARELA

BY

ATTORNEYS.

Dec. 4, 1962 R. L. PETRITZ ET AL 3,067,283

INFRARED IMAGE SYSTEM

Filed Dec. 10, 1959 4 Sheets-Sheet 2

INVENTORS.
R. L. PETRITZ
O. P. MANLEY
J. O. VARELA

BY O. Baxter Warner
D. Hodges
ATTORNEYS.

INVENTORS.
R. L. PETRITZ
O. P. MANLEY
J. O. VARELA

BY ATTORNEYS

Dec. 4, 1962 R. L. PETRITZ ET AL 3,067,283

INFRARED IMAGE SYSTEM

Filed Dec. 10, 1959 4 Sheets-Sheet 4

INVENTORS.
R. L. PETRITZ
O. P. MANLEY
J. O. VARELA

BY Baxter Warner & Hodges ATTORNEYS.

United States Patent Office 3,067,283

Patented Dec. 4, 1962

3,067,283
INFRARED IMAGE SYSTEM

Richard L. Petritz, Dallas, Tex., Oscar P. Manley, Cambridge, Mass., and James O. Varela, Kensington, Md., assignors to the United States of America as represented by the Secretary of the Navy Filed Dec. 10, 1959, Ser. No. 858,831
9 Claims. (Cl. 178—6.8)
(Granted under Title 35, U.S. Code (1952), sec. 266)

The invention described herein may be manufactured and used by or for the Government of the United States of America for governmental purposes without the payment of any royalties thereon or therefor.

This invention relates to an infrared image system, and more particularly to a system for obtaining an image of an object or area emitting infrared radiation.

The system employs a plurality of heat responsive cells which are arranged in columns and rows forming a matrix, and are each sequentially connected into an amplification system through which the signal from each cell is applied to the cathode ray tube of an oscilloscope. The cells are switched in synchronism with the horizontal and vertical sweeps of the cathode ray tube. The system is particularly useful for imaging infrared radiation of wave lengths in the two–ten micron region and also thermal radiation of wave lengths in the six–fifteen micron region.

Numerous infrared imaging devices and systems have been disclosed by the prior art, one of which is the single photoconductive detector with provision for mechanically sweeping the field of view in two directions across the detector. This method requires a very fast photoconductive cell because the cell must respond separately to each element of detail in the field of observation. For example, in a system with $10^4$ elements of detail and a frame rate of thirty c.p.s., the time allotted to each element is $3.3\times10^{-6}$ seconds. Therefore, the time constant of the cell must be about $3.3\times10^{-6}$ seconds. The sensitivity of the cell improves with increasing time constants, however, use of the fast cell inherently means poor sensitivity. In this system, high resolution is obtainable at the cost of decreased sensitivity, a serious disadvantage which the instant invention is designed to overcome.

Another of the prior systems employed the vidicon or orthicon principle which requires a very high resistivity ($p>10^{12}$ ohm-cm.) photoconductive or photoemissive material. Infrared sensitive materials have not been discovered which have such high resistivities at room temperature thus, infrared image devices which use the vidicon or orthicon principle must be cooled, which is a disadvantage not present in the instant invention.

A further prior art system employs a line array of photoconductive cells, with mechanical scanning in one direction across each cell. This enables the use of cells with longer time constants, for example, as used in the example given above the time constant would be $3\times10^{-4}$ seconds. However, the useable cell time constant is less than the total scanning time. Furthermore, resolution must be traded for sensitvity since the time constant must be faster if more resolution is desired.

Another of the prior art devices depends on the influence of infrared radiation on some quantity other than resistance. One such quantity is the photo-emissivity of a material, which is temperature dependent. A thermal image can be constructed by measuring the variations of photo-emission over the detector which can be scanned with a light beam to obtain an image. The chief disadvantage of this and similar devices is the low sensitivity, i.e., it takes a large change in temperature to give a detectable change in photo-emission.

The disadvantages and drawbacks of the prior art systems discussed above are not present in the instant inventive combination as will become readily apparent from the ensuing description thereof.

An object of the instant invention is to provide a new and improved infrared image detecting system.

Another object of this invention is the provision of an infrared image device in which the detector does not have to be cooled.

A further object of the invention is the provision of a system in which a fast detector does not have to be employed.

A still further object of this invention is the provision of an infrared detection system of the aforementioned character in which no loss of sensitivity is experienced.

A further object of this invention is in the provision of the system which allows the detector to be used to obtain maximum responsivity and sensitivity consistent with the requirement of frequencies and the radiation signal.

Another object of this invention is in a system which utilizes directly the change in resistance through a photoconductive effect or through a bolometric effect which gives a much larger responsivity than indirect methods of prior art systems.

A further object of this invention is in the provision of an infrared image system in which the resolution can be increased by adding more elements with no change in sensitivity.

A still further object of this invention is in the provision of a system of the aforementioned character in which the sampling of the individual responsive elements of the matrix provides a minimum of cross talk.

Other objects and many of the attendant advantages of this invention will be readily appreciated as the same becomes better understood by reference to the following detailed description when considered in connection with the accompanying drawings wherein:

FIG. 1 is a block diagram of the instant infrared image system;

FIG. 1*a* is a block diagram of a compensation system employable in the system of FIG. 1;

Figure 10:
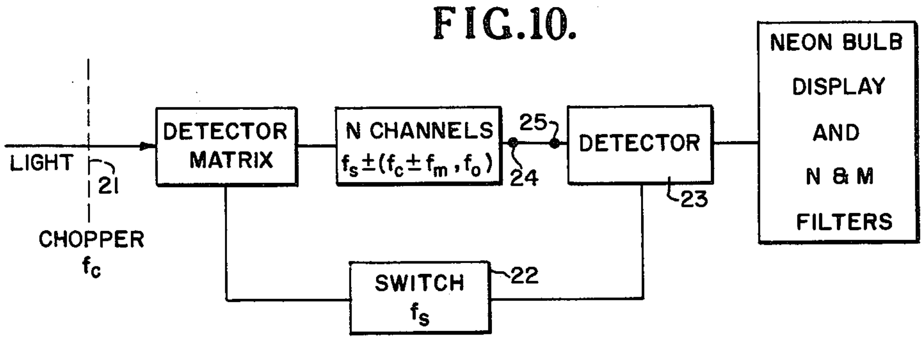
FIG. 10 is a block diagram of an alternative infrared image system where the radiation is chopped and $N\times M$ filters are used.
Figure 12:
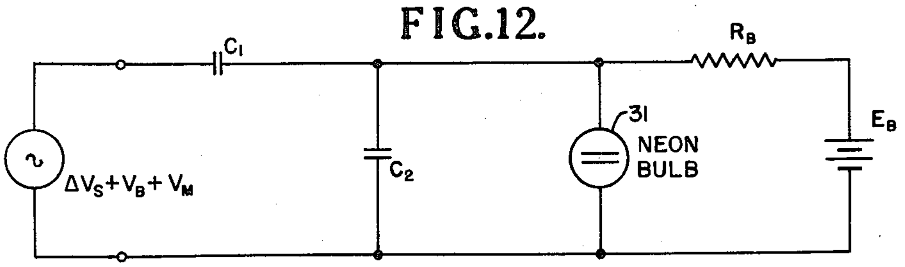

FIGS. 11*a* through 11*e* are voltage-frequency curves illustrative of the frequency spectrum of voltages due to background nonuniformities, radiation signals and undesired modulation products for the circuit shown in FIG. 10; and FIG. 12 is a neon bulb and associated filter for the system shown in FIG. 10.

Figure 1:
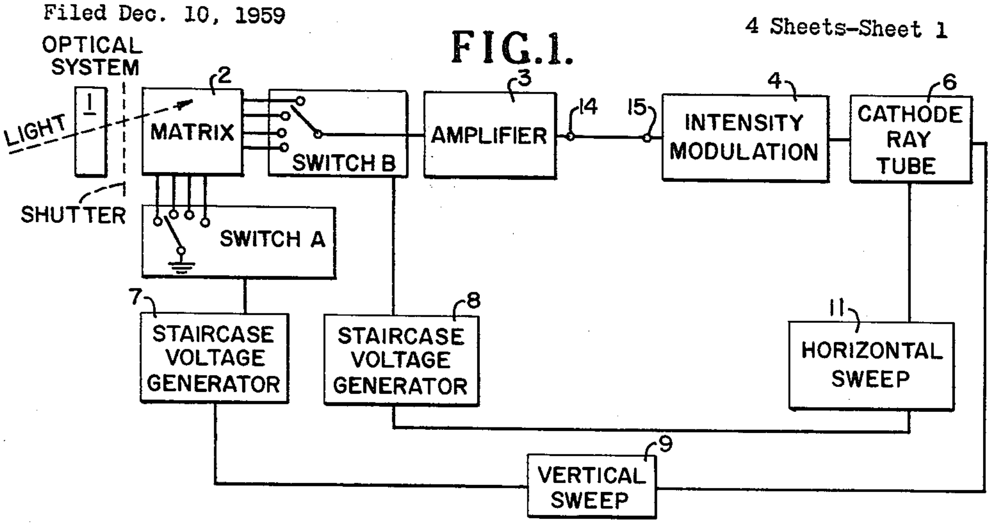
Figure 2:
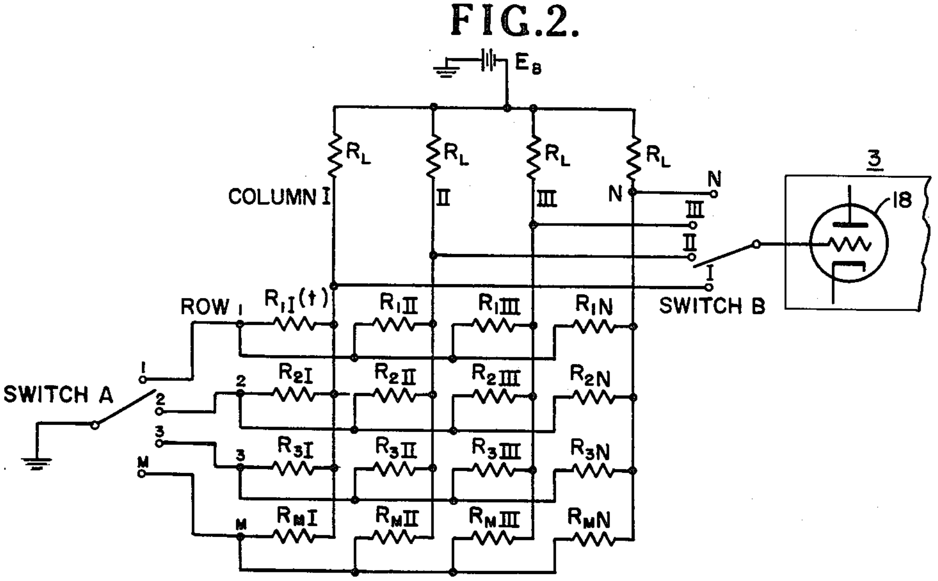
FIG. 2 is a schematic diagram of the matrix employed in the system.
Figure 1A:
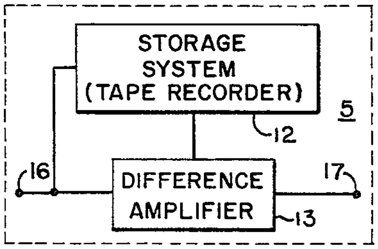

Referring now to the accompanying drawings wherein like reference characters indicate like or similar elements throughout the several views, and more particularly to FIG. 1 whereon is disclosed the overall block diagram of the infrared image system. An optical system and shutter denoted generally by the reference character 1 focuses an image of the field of view on the matrix 2. The output of the matrix 2 is applied to the amplifier 3 by action of switches A and B, which will be more fully described in connection with the description of the matrix itself (FIG. 2). The output of the amplifier 3 is fed to an intensity modulator 4 either directly through a lead connecting terminals 14 and 15 or through a compensation system 5 (FIG. 1*a*) to be hereinafter described in greater detail, and thence to a conventional cathode ray tube 6 of an oscilloscope for a visual presentation of the image. The amplified signal modulates the intensity of the cathode ray tube beam current as will be apparent to those skilled in the art. Furthermore, it will be apparent to those skilled in the art that other types of display devices could be employed such as a matrix of neon bulbs or electroluminescent elements without departing from the scope of the instant invention. Switches A and B are connected to staircase voltage generators 7 and 8, respectively, which are in turn connected to and synchronized with the vertical sweep circuit 9 and horizontal sweep circuit 11, respectively, of the cathode ray tube 6. Through this circuitry the horizontal and vertical sweeps of the cathode ray tube are synchronized with the switching of the matrix elements.

Referring now to FIG. 2, thereon is shown the circuit diagram of the matrix itself. For clarity only a sixteen-element matrix has been shown but for mathematical analysis a matrix of $N \times M$ elements will be considered, where N is the number of elements in a row, and M the number in a column. The heat responsive elements may be either photoconductive cells or bolometric cells. By bolometric cell is meant an element whose resistance changes with temperature, i.e. infrared radiation is absorbed by the bolometer causing its temperature to rise and to change the resistance. By photoconductive element is meant that the infrared radiation is absorbed directly in the electronic system of the semiconductor, causing a change in the resistance.

One of the salient features of the system shown in FIG. 2 is that the entire resistance matrix is exposed to the radiatioon at all times while detecting radiation as opposed to the prior single detector or row detector systems. The detectors can, therefore, have a much longer time constant and the time constant can be matched to the frequencies and the radiation to be detected. It will be apparent hereinafter from a consideration of the mathematical analysis of the system that this method has a built-in integrating feature htat greatly enhances its sensitivity.

As described above an optical system 1 focuses an image on the field of view of the matrix 2. The resolution is limited by the number of elements in the mosaic. The optical magnification is the ratio of the area of the collecting lens to the area of a single element. It should therefore be apparent that a matrix with elements each of very small area is desirable. However, the physical structure of the matrix does not form a part of this invention but matrixes suitable for use herein will be apparent to those skilled in the art, and may be comprised of photoconductive cells or bolometric cells, or other suitable elements. Printed circuit matrixes also can be made up of the aforementioned elements suitable for use in the instant system.

Figure 4:
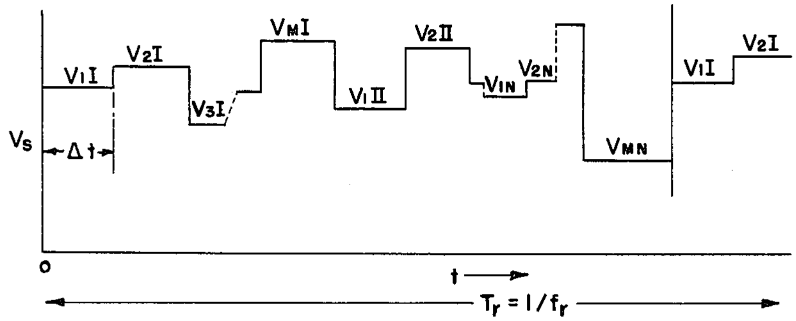
FIG. 4 is a voltage curve at the input of the preamplifier illustrating sampling of the complete matrix neglecting transient pulses.

Turning now to a consideration of the matrix itself and the sampling thereof, the heat responsive resistive elements are arranged in rows and columns as shown in FIG. 2. The Arabic numeral subscripts of the element R denote the rows of the matrix, and the Roman numeral subscripts on the element R denote the columns of the matrix and where N is the number of elements in a row and M the number in a column. In order to sample the resistance of $R_{1I}(t)$, the $(t)$ denoting that the resistance element is a function of time, row 1 is grounded through switch A and the amplifier is connected to column I through switch B. This switching can be done mechanically or electronically. The system disclosed in U.S. patent application Serial No. 654,430, now Patent No. 2,927,267, filed April 22, 1957, by the present inventors, provides a suitable system for electronic switching. With such an electronic switching system a matrix of $N \times M = 100{,}000$ elements may be employed without difficulty. However, mechanical switching would not be feasible for such a high resolution system, but would be adequate or even preferable for low resolution systems. All of the resistances in column I can be sampled in succession by moving the ground point at switch A to points 1, 2, 3, . . . M in succession. Considering for the moment this switching action to be perfect, i.e., devoid of transients, the voltage at the grid of preamplifier 18 of the amplifier 3 will be as shown in FIG. 4. After sampling elements are $R_{1I}$, $R_{2I}$, . . . $R_{MI}$, the amplifier connection is switched to column II. Then $R_{1II}$, $R_{2II}$, . . . $R_{MII}$ are sampled by successive grounding of points 1 . . . M through switch A as before. In this way all of the $N \times M$ elements are sampled. This output from the matrix i.e., the output of each heat responsive element is sequentially amplified and applied to modulate the intensity of the beam current of the cathode ray tube 6. As mentioned before, the switching actions of switches A and B are synchronized to the vertical and horizontal sweeps, respectively, of the cathode ray tube thereby providing a visual image of the object detected.

Figure 3:
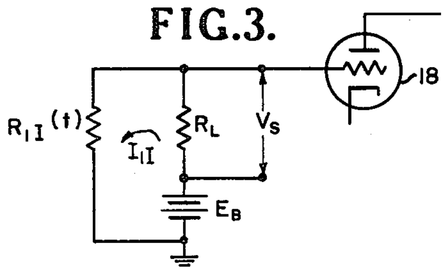
FIG. 3 is an equivalent circuit for analyzing the sampling of an individual element of the matrix.

For a more detailed understanding of this system the following mathematical analysis is included. Returning to the original connection in the matrix, i.e., $R_{1I}(t)$ being grounded through switch A and the preamplifier being conected to column 1 through switch B, the bias battery, $E_B$, is connected directly in series with $R_L$ and $R_{1I}(t)$. The equivalent circuit, neglecting all other elements of the matrix, is shown in FIG. 3.

From this circuit (FIG. 3) it can be seen, $$V_S = \frac{E_B R_L}{R_{1I} + R_L} \qquad (1)$$

The first consideration is with changes in $V_S$ and later with $V_S$ itself. For small changes in $R_{1I}$ there is for the change in $V_S$, $$\Delta V_S = -\frac{E_B R_L}{(R_{1I} + R_L)^2}$$

$$\Delta R_{1I} = -V_S \frac{\Delta R_{1I}}{(R_{1I} + R_L)} \qquad (2)$$

Therefore, for small signals $\Delta V_S$ is a direct measure of the change in $R_{1I}$.

After sampling all of the $M \times N$ elements as above described, a scan is completed which defines one frame, the total time for the frame being $$T_r = \frac{1}{f_r}$$

where $f_r$ is the frame rate.

The time intervals $\Delta t_s$, allotted for sampling each element will depend on the frame rate, $f_r$, and the number of elements as, $$\Delta t_s = T_r / N \times M, \quad T_r = 1 + f_r \qquad (3)$$

For example, if $f_r = 30$ frames per second and $$N \times M = 1{,}000$$

elements then $$\Delta t_s = \frac{1}{30 \times 10^3} = 3.3 \times 10^{-5} \text{ seconds}$$

The switching frequency is $$f_s=\frac{1}{\Delta t_s}=3\times 10^4 \text{ c.p.s.}$$

$$f_s=N\times M/T_r=N\times Mf_r \qquad (4)$$

The following is a consideration of the relation of the time constant of the detector elements to the signal modulation frequencies. Each element is continually receiving radiation, independent of whether or not it is being sampled. Therefore, the change in resistance of an element is described by $$\frac{d\Delta R_{11}}{dt}+\frac{\Delta R_{11}}{\tau}=KJ_{11}(t) \qquad (5)$$

where $\tau$ is the photoconductive or bolometric time constant of the matrix material, $J_{11}(t)$ is the radiation flux density incident on the element, and K is the proportionality factor. Considering the radiation to be sinusoidally modulated at a frequency $f$, $$J_{11}[t]=\bar{J}_{11}\sin 2\pi ft \qquad (6)$$

The signal modulation frequencies lie in the frequency range $0\leqq f\leqq f_m$ where $f_m$ is the maximum frequency to be detected in the radiation signal. Substituting Equation 6 into Equation 5 and solving $$\Delta R_{11}[f]=\frac{K\tau\bar{J}_{11}}{[1+[2\pi f\tau]^2]^{1/2}} \qquad (7)$$

$$\Delta V_S=\frac{-V_S\tau K\bar{J}_{11}}{[R_{11}+R_L][1+[2\pi f\tau]^2]^{1/2}} \qquad (7b)$$

Figure 5:
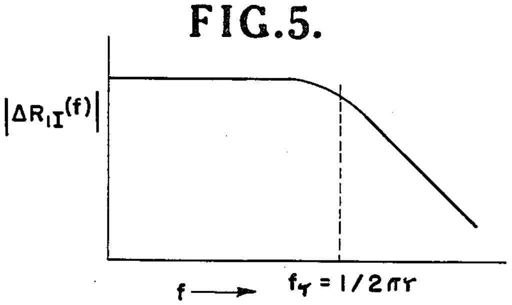
FIG. 5 is a frequency dependence curve of the photoconductive or bolometric response of a typical matrix element as given by Equation 7.

In Equation 7 above $(f)$ denotes that the equation is a function of frequency, and FIG. 5 is a plot of $|\Delta R_{11}|$ vs. frequency. From Equation 7 it can be seen that the magnitude of the change in resistance is directly proportional to $\tau$. From FIG. 5 and Equation 7*b* it can be seen that the response is uniform out to frequencies of the order of $$f_\tau=\tfrac{1}{2}\pi\tau \qquad (8)$$

That is, the detector elements will respond nearly equally to radiation signals modulated at frequencies from zero (0) to $f_\tau$. It can then be seen that for optimum use of the device $$f_\tau\cong f_m \qquad (9)$$

since this condition assures that maximum response is obtained (Equation 7*b*) consistent with the requirement that all radiation signals of interest will be uniformly detected.

For an image device where the human eye looks at the output, the frequency response of the eye limits the useful radiation modulation frequencies to about 30 c.p.s. In devices where the image is used in a control or computer circuit, the human eye not being involved, much higher radiation signal frequencies are also of interest. For the purposes of this analysis, however, the eye will be considered to be involved and, therefore, $f_m$ will be taken to be approximately equal to 30 c.p.s.

It is to be emphasized that an essential feature of this system is that $\tau$ is fundamentally governed by the frequencies in the radiation signal, and not by the sampling rate. This, therefore, will result in a more sensitive system than one in which $\tau$ is related to the time, $\Delta t$, allotted for sampling each element in the field as above. To show this, a single detector is used such that a resolution corresponding to NM elements is obtained. The detector is exposed to radiation from each element of the field of view for a time, $$\Delta t_2=T_r/NM \qquad (10)$$

Considering an element to be exposed to the radiation for an interval $\Delta t_2$, there can be found from Equation 5, $$J_{11}=0 \quad t<0$$
$$=\bar{J}_{11} \quad 0<t<t_2$$

and $$\Delta R_{11}(2)=KJ_{11}\tau_2(1-e^{-t/\tau_2}) \qquad (11)$$

where (2) is used to distinguish this case from that discussed in Equation 7. Examination shows that if the signals from adjacent elements are to be resolved $\tau_2$ must be of the order of or less than $\Delta t_2$. This means $$\tau_2\leqq T_r—NM \qquad (12)$$

For the above example, where $N\times M=10^3$, $f_r=30$ c.p.s., $\tau_2=3\times10^{-5}$ sec. Because the response is proportional to $\tau_2$ in this case (Equation 11), and to $\tau$ in the instant device (Equation 7), it can be seen that the ratio of the two $$\frac{\Delta R_{11}}{\Delta R_{11}^{(2)}}=\frac{\tau}{\tau_2}=\frac{1/30}{3\times10^{-5}}\cong10^3$$

Thus the instant inventive system inherently offers considerably greater signal response and improved sensitivity because the elements can have much longer time constants. By matching the time constant, $\tau$ to the maximum modulation frequency of the signal, the signal is effectively being integrated for a period of $\tau$.

There are available detectors which have $\tau$ of the order of magnitude of $\frac{1}{30}$ second. For bolometers this is a typical time constant. Lead sulfide cells have $\tau\cong10^{-3}$ secs. and may be made slower. In the past, emphasis has been on developing fast detectors, however, it should be apparent to those skilled in the art that to fully utilize this new inventive system of applicants' fast detectors are no longer required and slow detectors are actually preferable.

Another feature of the instant invention is that $\tau$ is independent of the resolution, whereas Equation 12 shows that in prior devices $\tau$ must be made shorter if the resolution is to be increased. However, in the instant device increased resolution can be achieved by increasing the number of elements $(N\times M)$ without changing $\tau$; the switching rate of course increases which is discussed in more detail below.

*Relation of Sampling Rate Frequencies in Radiation Signals*

According to Shannon's sampling theorem the sampling rate, $f_r$, must be at least twice the maximum frequency of the radiation signal if the information in the signal is to be retained in the sampling process. Therefore, $$Ff_r\geqq 2f_m=2f_\tau \qquad (13)$$

Figure 6:
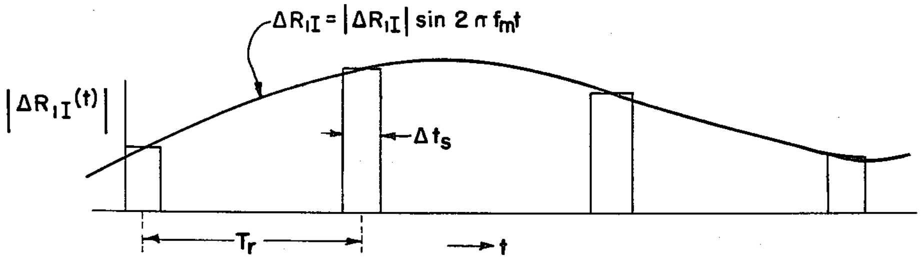
FIG. 6 is a time dependence curve of the photoconductive or bolometric response of a typical matrix element as given by Equation 14.

That is, if the signal resistance of an element varies as $$\Delta R_{11}=|\Delta R_{11}|\ sin\ 2\pi f_m t \qquad (14)$$

as shown in FIG. 6, it must be sampled at a rate of at least twice $f_m$. Therefore the switching frequency $f_s$ is $$f_s=1/\Delta t_s=NMf_r\geqq NM2f_m \qquad (15)$$

For the example discussed above, it can be determined $$N\times M=1000,\ f_m=30$$
$$f_s\geqq 60{,}000 \text{ c.p.s.}$$

This switching can be done electronically as described above by a switch such as that disclosed in the aforementioned U.S. patent application Serial No. 654,430. $N\times M=100{,}000$ elements can be sampled by electronic switching without undue difficulty, however, as aforementioned. mechanical switching would not be feasible for such high resolution systems, but is adequate or even preferable for low resolution systems.

*Resolution and Cross-Talk*

The resolution of the instant system is limited by the number of elements in the matrix and the optical system. Beyond this there are other factors which must be considered:

(A) Cross-Talk in the Matrix: Up to now the effects of other resistances in the matrix when connected across $R_{1I}$ have been neglected. Examinations show that there are other parallel circuit paths in the matrix so that $\Delta V_{1I}$ has a contribution from other elements in the matrix. Analysis of this shows that $$\Delta V_{1I}=\frac{E_B}{g_L}\left(\Delta G_{1I}+\frac{G_{2I}}{g_L}\Delta G_{1II}+\frac{G_{1III}}{g_L}\Delta G_{3I}+\dots+\frac{G_{1N}}{g_L}\Delta G_{NI}\right), g_L\gg G_{1I} \quad (16)$$

where $$G_{1I}=1/R_{1I}=G_{1II}=\dots=G_{1N},\ g_L=1/R_L$$

The first term is the desired signal and agrees with equation 7*b* when $$g_L\gg G_{1I} \quad (17)$$

The remaining terms are undesired signals from others elements of the matrix and represent cross-talk or the reduction in resolution. By mismatching the load, the cross-talk from any one other element is reduced by the factor $G_{1I}/g_L=R_L/R_{1I}$. For example, if $R_L=5K$ and $R_{1I}=500K$ the reduction is a factor of 100 in voltage or 40 db. If the cross-talk contributions from all elements add up, the requirement becomes $$g_L\gg NG_{1I} \quad (18)$$

Since the maximum signal is obtained by having $R_L=R_{1I}$, reducing $R_L$ reduces the signal voltage as can be seen by Equation 16. However, it will be shown below that the noise is also reduced. The loss of signal can be made up by increasing the gain in the amplifier following the detectors. Furthermore, a small $R_L$ will be shown to be necessary in order to have adequate frequency response.

(B) Cross-Talk in Amplification System: A second source of cross-talk is in the amplification system. Ideally the amplifier should reproduce the wave form shown in FIG. 4, but at a higher power level. Because of the finite band-width in the amplifier some distortion of the signal will occur. An analogous problem in communication theory has been analyzed and shows that to reduce cross-talk between pulses, the amplifier band-width B must be such that $$B\geqq f_s=1/\Delta t_s \quad (19)$$

where $\Delta t_s$ is the time allotted per sample and $f_s$ is the switching frequency. Therefore, from Equation 15

$$B\geqq NMf_r 2NMf_m \quad (20)$$

For example, with $f_m=30 N\times M=10^3$, $B\geqq 60{,}000$ c.p.s.

The R in C in time constant of the preamplifier input circuit can limit the amplifier response at high frequencies. Thus $$R_{in}C_{in}\geqq\frac{1}{2\pi B} \quad (21)$$

where $$1/R_{in}=1/R_{1I}+1/R_L \quad (22)$$

For $C_{in}\cong 100\ \mu\mu f.$ $$R_{in}\leq\frac{10^{12}}{2\pi\times 6\times 10^4\times 10^2}\cong\frac{1}{40}\times 10^6$$

$R_{in}\leq 25{,}000$ ohms

Since $R_{1I}\cong 500{,}000$ to have $R_{in}=25{,}000$ it can be seen that $R_{in}\cong R_L=25{,}000$ ohms
$rR_L/R_{1I}=0.05.$ Thus a small $R_L$ is needed to meet the band-width requirements for minimum cross-talk in the amplification system, as well as for minimum cross-talk from other matrix elements. The smaller $R_L$, the less of both kinds of cross-talk, but the more gain required in the amplifier.

In the instant invention there is fixed noise due to switching transients. The curve shown in FIG. 4 is based upon an ideal switching system. Actually there will be small dead time between each switching process and therefore the signal at the input to the amplifier will look like that shown in FIG. 7 rather than that of FIG. 4. The amplitude of the transient pulses, $V_t$, will be of the order of $V_S$, the steady voltage across $R_L$. The energy content of these pulses is distributed over harmonics of the switching frequency, $f_s$, $2f_s$ . . . $nf_s$ where $f_s=NMf_r$, $\geqq 2MNf_m$ where $f_r$ is the frame rate and $f_m$ is the maximum modulation frequency in the radiation signal.

Figure 7:
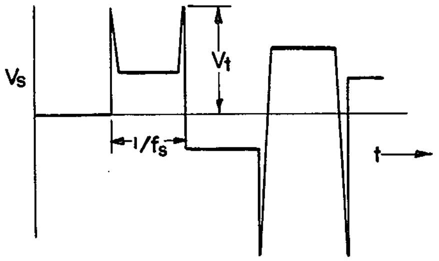
FIG. 7 is a curve of the input voltage at the preamplifier illustrating sampling of the complete matrix including transient pulses.
Figure 8:
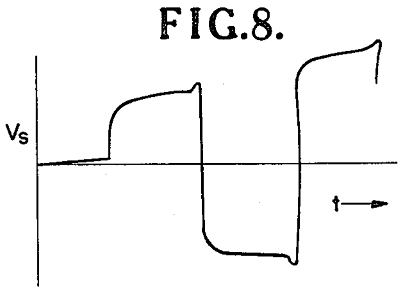
FIG. 8 is illustrative of the voltage at the preampliler or amplifier when a bandpass filter is used to reduce switching transients.

Experimental study of these transients for the electronic switch described in U.S. patent application Serial No. 654,430 shows that the transient voltage at $f_s$ is only about $1/1000$ of the total transient pulse energy ($V_t$ of FIG. 7). The voltage at higher harmonics is about the same as at $f_s$. Filtering in the amplifier channel will reduce all of the harmonics above $f_s$, since, as shown by an Equation 20, the channel band width, B need be no larger than $f_s$. Therefore transients of the switching process can be reduced to correspond to $\Delta R/R\cong 10^{-3}$. A low pass filter in which $B\cong f_s$ changes the curve of FIG. 7 to look like that of FIG. 8.

Systems such as the present one described are limited by fixed noise due to nonuniformities in the resistance of the detector elements. Control of the resistance to better than 1.0 to 10% is not readily achieved. Thus, unless some method of reducing this effect is used, the present limit of sensitivity corresponds to signals which produce $\Delta R/R\cong 10^{-2}$, $1^{-1}$. This can be expressed quantitatively in terms of the specific responsivity $R_s$, of the detector. $R_s$ is defined by the equation $$\Delta V_S=\frac{R_s E_B J\cdot R_{1I}R_L}{(R_{1I}+R_L)^2} \quad (23a)$$

where all terms have been defined. From Equations 2 and 7 it can be seen that $$\Delta V_S=\frac{E_B R_L|\Delta R_{1I}|}{(R_{1I}+R_L)^2} \quad (23b)$$

Equation 23*a* shows that $R_s$ is a measure of how the cell converts radiation flux density J to signal voltage. Analysis shows that $R_s$ is independent of cell area and bias, and is a specific function of the detector. For photoconductive cells, $$R_s=\frac{(1+B)\tau\eta_s}{4pdh\gamma_s} \quad (23c)$$

where $\tau$ is the photoconductive response time; $\eta_s$ is the quantum for absorption of radiation of spectral frequency $\gamma_s$; $p$ is the density of majority carriers, $d$ is the film thickness; $h$ is Planck's constant; and B is the barrier modulation factor.

From Equations 23*a* and 23*b* it can be shown that $R_s$ is defined by $$R_s=\frac{\Delta R_I/B_{1I}}{4J} \quad (23d)$$

that is, $R_s$ is a measure of the fractional change in resistance per unit flux density of incident radiation. Knowledge of $R_s$ for a given type detector along with Equation 23*d*, enables the solution for the minimum detectable flux density at the detector, $$J_{\min(\text{detector})}=\frac{\Delta R}{4RR_s} \quad (24a)$$

For $P_bS$, $R_s\cong 200$ for radiation in the 2–3 micron region. Then, using $\Delta R/R=10^{-2}$ it can be found that, $$J_{\min(\text{det.})}=\frac{10^{-2}}{4\times 200}\cong 10^{-5}\ \text{watts/cm.}^2$$

For a detector element of area $A_D$ the minimum detector power is $P_{\min}=J_{\min}A_D=10^{-7}$ watts, $A_D=10^{-2}$ cm.$^2$.

This figure is for the flux density actually incident on the detector elements. A good optical system enhances this figure. For example, consider that the aperture of the lens or mirror is of area $A_L$, and the area of each detector element is $A_D$. Then for distant objects, the flux density at the detector, $J_{det}$, is $$J_{det.}=\frac{A_L}{A_D}J_L=MJ_L$$

where $M=A_L/A_D$ optical magnification, $J_L$ is the flux density incident on the lens. Thus the minimum detectable flux density at the lens is $$J_{L(min).}=\frac{1}{M}\times J_{det.(min.)}$$

$$J_{L(min.)}=\frac{\Delta R/R}{4MR_s} \quad (24c)$$

Equation 24c defines the minimum detectable flux density at the lens of the optical system, and shows that the optical magnification increases the sensitivity.

Reasonable values, but not as limitations for $A_D$ and $A_L$ are $$A_D=1 \text{ min.}^2 \text{ (per element)}$$
$$A_L=100 \text{ cm.}^2$$

$$M=\frac{A_L}{A_D}=10^4 \text{ (magnification)}$$

Therefore, $$J_{L(min.)}=10^{-9} \text{ watts/cm.}^2 \quad (24d)$$
$$P_L=J_{L(min.)}A_L=10^{-7} \text{ watts}$$

It should be noted that optical magnification does not increase the power level of the signal radiation. However, it improves the sensitivity when nonuniformities set the limit because as Equation 23a shows the signal voltage from a detector element is proportional to the incident flux density, not the total power of radiation. Therefore, concentration of the incident radiation in a small area increases the flux density (watts/cm.$^2$) and consequently the output signal. Hence, the nonuniformities are more easily overcome.

Thus the use of a high magnification optical system, which involves making the matrix element in the matrix as compact as possible, is important in the instant system. It is important to note that the electronic switching does not limit the device.

*Methods for Reducing the Effects of Nonuniformities in the Film and Switching Transients*

In order to achieve greater sensitivity it is necessary to reduce the effect of nonuniformities in the resistance matrix. One procedure, of course, is to make the resistors more uniform, however it is probable that a practical limit of 0.1 to 1% exists.

Beyond this approach data processing offers considerable advantages. The following is a method that gives an additional improvement of at least a factor of 100. This is shown schematically by FIG. 1*a*. In this figure is shown a compensation system 5, including a storage system 12 and difference amplifier 13, with terminals 16 and 17 adapted to be connected to terminals 14 and 15, respectively, of the system of FIG. 1. At some prescribed time the shutter in the optical system 1 is caused to shut off the light signal falling on the detector, the amplifier 3 being simultaneously switched to the storage system 12. The amplified signal produced in the subsequent frame time $T_r$ then represents the dark condition of the matrix and is recorded in the storage system which may be, for example, a magnetic tape. After storing the record of the complete matrix, the operation of the storage system being synchronized with the operation of switches A and B, the shutter is opened and light falls on the detector, and simultaneously the amplifier is switched to the difference amplifier 13. The input of the difference amplifier then contains the dark condition plus the signal due to radiation. The synchronized output of the storage system and the amplifier being fed into the difference amplifier 13, its output is proportional to the difference in the two input signals and thus contains only the radiation signal, removing the effects of nonuniformities. The initial variation may be reduced by a factor of 100 or more in this way. This means that if the original amplifier voltage contained voltages corresponding to 1.0% variation in matrix resistances, signals corresponding to $\Delta R/R$ of about $10^{-4}$ will be detectable. In other words, the fixed noise will be reduced to the order of $10^{-4}$. This means that for $P_bS$, $$J_{min}\cong 10^{-11} \text{ watts/cm.}^2$$

and for bolometers $$J_{min}=2\times 10^{-9} \text{ watts/cm.}^2$$

This is a considerable improvement over any existing infrared image device. It is within a factor of $10^3$ of the limit set by detector noise.

An alternate method of switching is to use N preamplifiers and amplifiers instead of one (1) as in FIG. 2. Hence, there will be an amplifier connected to each terminal of switch B in FIG. 2. With this the switching rate of the detector is only $$f_{se}=Mf_r \quad (25)$$

After preamplification the output of the N amplifiers can be sampled at the rate $$f_{s2}=Nf_s=NM_{fr}$$

if it is desired to have all of the information in one channel. The data processing, above described, would proceed as before.

Figure 9:
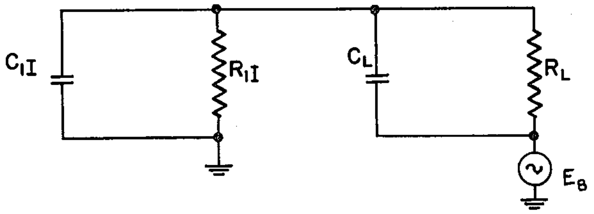
FIG. 9 is an equivalent circuit for analyzing very fast switching.

The advantage of this system is that a lower switching rate will be required at the detector, thus reducing switching transients. The fast switching will be done at a higher signal level and will not introduce noise there. Furthermore, for high resolution systems difficulty will eventually be experienced in switching at very high rates at the detector because of the high impedance of the detector elements and their inherent shunt capacity. FIG. 9 is the A.C. equivalent circuit of FIG. 3 showing the effect of the various capacitors. Analysis of this circuit shows that the shunt capacity, $C_{11}$, will set a limit to the rate of switching, roughly when $$\frac{1}{2\pi f_s C_{11}}<R_{11}$$

Thus this alternative system enables switching at the detector at the lower rate, $f_{s1}$ (Equation 25), and then switch at the output at the higher rate $f_{s2}$, after the signals have been amplified. The impedance level can be made much lower at amplification, so much higher switching rates can be achieved. This modification will require $N-1$ additional preamplifiers, the cost of which has to be balanced against the advantages to be derived from the use of this particular embodiment.

Figure 11:
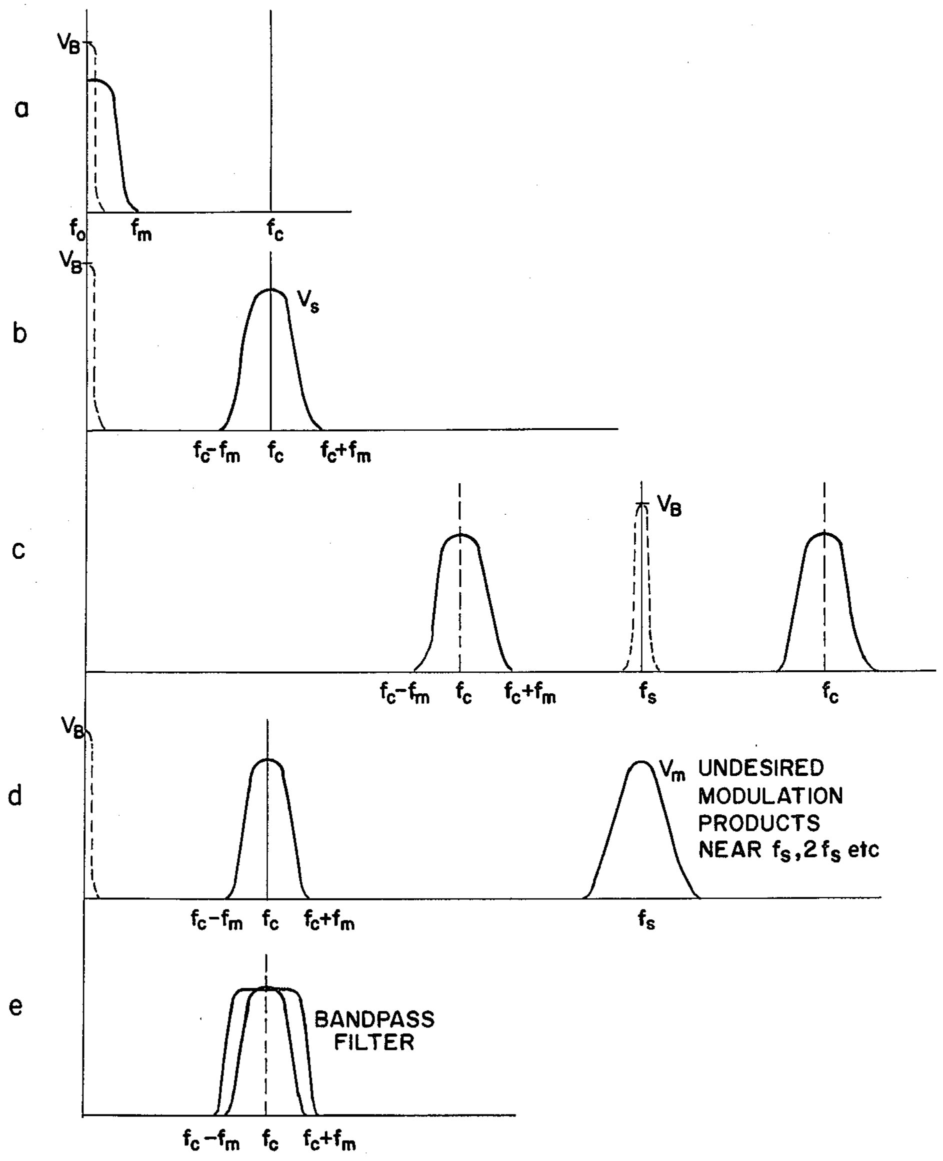

Along the same lines, MN preamplifiers may be used to build the signal level up before switching. However, for a large system this is very bulky but the advantages thereof may be desirable to those skilled in the art providing the element is matched carefully. Another alternate system with reduced fixed and random noises is shown in FIG. 10. The signal radiation is chopped by the chopper 21 at a frequency, $f_c$. This transfers the signal, $V_S$, to frequencies $f_c\pm f_m$ as shown by FIGS. 11*a* and 11*b*. The background voltage due to nonuniformities, $V_B$ at D.C. or low frequencies is not modulated by the chopping. This voltage is shown on FIGS. 11*a* and 11*b* by the dotted lines. Therefore, the signal has been separated from the background effects. The sampling process, the operation of switch 22 being synchronized with the operation of the detector 23, in effect transfers both signal and background to frequencies centered at $f_s$, as shown in FIG. 11c. Demodulation brings the signal and background back to that shown in FIG. 11d. There will also be some undesired demodulation products, $V_M$ near $f_s$, $2f_s$ depending on the method used for demodulation. If a bandpass filter is connected to each element of the display the background component $V_B$ may be filtered out, and also the undesired demodulation products $V_M$, as shown by FIG. 11e.

FIG. 12 discloses the circuit for accomplishing this result. $E_B$ and $R_B$ bias the neon bulb 31 to a low light level. $\Delta V_S+V_B+V_M$ is filtered by $C_1$ and $C_2$, $C_1$ for $V_B$ and $C_2$ for $V_M$. The advantage of this system is that the effects of nonuniformities can be greatly reduced. A filter is required for each element of the display.

It also may be desirable to use the recorder method of reducing nonuniformities along with the filtering. The compensation system 5 of FIG. 1a may be connected at terminals 24 and 25. This is quite useful if a very high sensitivity is desired. The compensation system will reduce the 1.0 to 10% variation by a factor of 100, and the filter will reduce it still further. To avoid blocking the amplifiers the recorder is used at an intermediate voltage level and then further gain is used to bring the signal up to the voltage level necessary to modulate a neon bulb or an electroluminescent screen. It should be noted the frequency characteristic of the display element must be considered in the choice of the filter. For example an electroluminescent screen does not respond to D.C., so condenser $C_1$ in FIG. 12 would not be needed.

To derive extreme sensitivity in any of the embodiments of the instant invention it may be desirable to cool the matrix although very high sensitivities are achieved without cooling. As can be seen from Equation 23c cooling decreases $p$ and increases $\tau$, both of which result in an increase of $R_s$. From Equation 24c is can be determined that increasing the responsivity directly improves the sensitivity when nonuniformities establish the fixed noise level.

It should be apparent from the foregoing that the instant invention offers many advantages over prior systems. As mentioned before, the instant system utilizes directly the changes in resistance through a photoconductive effect or through a bolometric effect. This gives a much larger responsivity than the prior indirect methods. Since both the instant system and the prior systems are at present somewhat limited by nonuniformities in the film surface, it can be seen from Equation 24 that the higher responsivity of the instant system makes it more sensitive. Of course, the use of compensation to reduce the background fixed noise will aid all such systems but the instant system will provide the greatest sensitivity when compensated because of the larger responsivity. (Note Equation 24.)

The resolution in the instant inventive system can be increased by adding more elements with no change in sensitivity. This is because the time constant $\tau$ is not involved in the switching rate. Thus, the resolution can be independently adjusted to meet specific needs without altering the limiting sensitivity which cannot be achieved in the prior art systems.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In a device for detecting an object by reception of infrared radiation emitted by said object, a matrix formed of a plurality of rows and columns of infrared radiation responsive resistance elements arranged to receive said radiation, switch means connected to said matrix to connect each element of said matrix sequentially to a first circuit means for sensing the conductivity of said elements, a cathode ray tube display means connected to said first circuit means, second circuit means connected to said switch means and said cathode ray tube display means for synchronizing the operation of said switch means with the vertical and horizontal sweeps of said cathode ray tube whereby said display means provides a visual indication of the aforesaid device emitting infrared radiation, and a compensation system included in said first circuit means and comprising storage system means and a difference amplifier means, said storage means storing the output of said matrix when it is not receiving radiation, and said difference amplifier means having as its input said stored output of said matrix and the output of said matrix when it is receiving radiation, whereby the output of said difference amplifier means modulates the beam of said cathode ray tube.

2. A device as in claim 1 wherein the output of said difference amplifier means is the difference between the output of said matrix while receiving radiation, and the output of said matrix stored in said storage system means.

3. A device as in claim 2 wherein an optical system means is included between said device emitting infrared radiation and said matrix, for affecting the sensitivity of said system.

4. An infrared image device for receiving and providing a visual image of an object emitting infrared radiation comprising, a matrix of heat responsive resistance elements arranged in rows and columns, first switch means for selectively connecting each row of said elements between a power source and ground, second switch means for connecting each column of said elements to the input of an amplifier, first circuit means connecting the output of said amplifier to the input of an oscilloscope, second circuit means connected to said first switch means and to the vertical sweep circuit of said oscilloscope for synchronizing the operation of said first switch means and the vertical sweep of said oscilloscope, and third circuit means connected to said second switch means and the horizontal sweep circuit of said oscilloscope for synchronizing the operation of said second switch means with the horizontal sweep of said oscilloscope whereby the radiation received by said matrix is converted into electrical signals indicative of the conductivity of each of said elements, both of said switch means sampling sequentially each of said elements which provides a control signal applied through said amplifier and said first circuit means to control the beam intensity of said oscilloscope providing a visual image of said infrared radiating object.

5. An infrared image devce as in claim 4 wherein said first circuit means comprises a compensation system including a storage system means for storing the output of each of said elements when no radiation is being received by said matrix, and a difference amplifier for subtracting from the output of each of said elements of said matrix during radiation reception the stored output of said matrix, providing a difference signal and applying this difference signal to said oscilloscope.

6. An infrared image device as in claim 5 including an optical system between said infrared radiation emitting object and said matrix, including shutter means for selectively controlling the radiation impinging upon said matrix.

7. A device for producing a visual image of an object emitting infrared radiation comprising, a matrix comprising a plurality of heat responsive elements, chopper means for varying the radiation intensity impinging upon said matrix, said matrix comprising N rows of said elements each of which is connected to N amplification channels, said N amplification channels being connected to a detector means, switch means being connected with said matrix and said detector means, said detector means being connected to a display means comprising $N \times M$ filters to filter out the background signals present in said system and the undesired demodulation products of said detector, and neon bulb means for providing a visual image of said infrared radiation emitting object.

8. A device as in claim 7 wherein said device includes a compensation system connected between said N amplifier channels and said detector means comprising a storage system for storing the output of said matrix when no radiation is being received and a difference amplifier for providing a difference signal of the output of said matrix when receiving radiation and the output of said storage system whereby undesirable background signals of said system are further eliminated.

9. In an image detecting system, a matrix of radiation sensitive resistance devices, switching means for selectively sampling the conductivity of each element of the matrix, shutter means for periodically interrupting the radiation falling on said matrix, a storage system for receiving the signals from said switching means, said storage system being synchronized with said shutter to receive the signals from said switching means during the period when said shutter is closed, a difference amplifier, means connecting said difference amplifier to said switching means during the time said shutter is open and to said storage system to simultaneously receive the signal from said switch and from said storage system, means for applying the output of said difference amplifier to a cathode ray tube to modulate the intensity of the beam of said cathode ray tube, and means for synchronizing the sweep of said cathode ray tube with the switching of the elements of said matrix.

References Cited in the file of this patent

UNITED STATES PATENTS

| | | |
|---|---|---|
| Re. 17,712 | Schmierer | June 24, 1930 |
| 2,403,066 | Evans | July 2, 1946 |
| 2,453,502 | Dimmick | Nov. 9, 1948 |
| 2,909,668 | Thurlby | Oct. 20, 1959 |
| 2,929,868 | Leiter | Mar. 22, 1960 |
| 2,951,175 | Null | Aug. 30, 1960 |